US012720658B2

(12) United States Patent
Guerra

(10) Patent No.: US 12,720,658 B2
(45) Date of Patent: Aug. 25, 2026

(54) PRESET CONTROL LOOP FOR PPG LED DRIVER

(71) Applicant: STMicroelectronics International N.V., Geneva (CH)

(72) Inventor: Ranieri Guerra, S. Giovanni la Punta (IT)

( * ) Notice: Subject to any disclaimer, the term of this patent is extended or adjusted under 35 U.S.C. 154(b) by 95 days.

(21) Appl. No.: 18/951,195

(22) Filed: Nov. 18, 2024

(65) Prior Publication Data

US 2026/0143572 A1 May 21, 2026

(51) Int. Cl.

*H05B 47/11* (2020.01)
*H05B 45/345* (2020.01)
*H05B 47/16* (2020.01)
*H05B 47/165* (2020.01)

(52) U.S. Cl.

CPC ........... *H05B 47/11* (2020.01); *H05B 45/345* (2020.01); *H05B 47/16* (2020.01); *H05B 47/165* (2020.01)

(58) Field of Classification Search

CPC ...... H05B 47/11; H05B 45/345; H05B 47/16; H05B 47/165

See application file for complete search history.

(56) References Cited

U.S. PATENT DOCUMENTS 10,548,519 B2 * 2/2020 Arias .................. A61B 5/6826
2010/0295476 A1 11/2010 Franco
2013/0200873 A1 8/2013 Wu
2017/0156651 A1 * 6/2017 Arias ................. A61B 5/14552
2019/0044432 A1 2/2019 Op Het Veld
2019/0209033 A1 7/2019 Finlinson
2023/0156881 A1 5/2023 Gritti

FOREIGN PATENT DOCUMENTS

CN 112235903 B 5/2024

* cited by examiner

*Primary Examiner* — Abdullah A Riyami
*Assistant Examiner* — Syed M Kaiser
(74) *Attorney, Agent, or Firm* — Slater Matsil, LLP

(57) ABSTRACT

According to an embodiment, a driver circuit for a light emitter in a photoplethysmography (PPG) system includes a main control loop with an operational amplifier and a transistor configured as a source follower. During a preset control phase, a preset circuit sets the operational amplifier output voltage to a preset level. A switching circuit activates the preset circuit during the preset phase and the main control loop during the main control phase. The preset circuit preconditions the gate voltage of the source follower transistor to near its threshold voltage before the main control loop activates. This improves start-up performance by reducing delay and uncontrolled initial current while avoiding the need for amplifier trimming. The circuit enables fast settling time and precise control of short current pulses with very low duty cycles, benefiting PPG measurement accuracy and power efficiency in wearable health monitoring devices.

20 Claims, 5 Drawing Sheets

PRESET CONTROL LOOP FOR PPG LED DRIVER

TECHNICAL FIELD

The present disclosure generally relates to electronic devices and, in particular embodiments, to a preset control loop for a Light Emitting Diode (LED) driver.

BACKGROUND

Photoplethysmography (PPG) is a widely used noninvasive optical technique for detecting blood volume changes in the microvascular bed of tissue. It's commonly employed in healthcare monitoring devices to measure physiological parameters such as heart rate, oxygen saturation, and pressure. PPG technology relies on the principle that blood absorbs more light than surrounding tissues, so variations in blood volume affect the transmission or reflection of light.

In PPG measurements, light-emitting diodes (LEDs) illuminate the skin tissue, while photodiodes detect the small variations in light intensity caused by changes in blood volume. The measurements typically involve short light pulses with very low-duty cycles to conserve power, as many PPG devices are battery-operated. The LED driver circuit, responsible for controlling these light pulses, plays a role in the accuracy and efficiency of PPG measurements.

One of the challenges in PPG technology is dealing with ambient light, which can interfere with the optical measurements. PPG systems often incorporate ambient light compensation (ALC) techniques to address this issue. This may involve taking additional light measurements immediately before and after the main PPG sampling to detect and cancel out the effects of ambient light.

SUMMARY

Technical advantages are generally achieved by embodiments of this disclosure, which describe a preset control loop for a Light Emitting Diode (LED) driver.

A first aspect relates to a system for photoplethysmography (PPG) measurements. The system includes a light emitter; a light detector configured to detect light from the light emitter; and a driver circuit coupled to the light emitter, the driver circuit comprising: a main control loop including an operational amplifier and a first transistor configured as a source follower, a preset circuit coupled to the operational amplifier and configured to set a voltage at an output of the operational amplifier to a preset voltage during a preset control phase, and a switching circuit configured to activate the preset circuit during the preset control phase and to activate the main control loop during a main control phase.

A second aspect relates to a driver circuit for a light emitter in a photoplethysmography (PPG) system. The driver circuit includes an operational amplifier; a first transistor configured as a source follower, with a gate of the first transistor coupled to an output of the operational amplifier; a preset circuit configured to set a voltage at the output of the operational amplifier to a preset voltage during a preset control phase; and a switching circuit configured to: couple the preset circuit to a non-inverting input of the operational amplifier during the preset control phase, and activate a main control loop during a main control phase by coupling a reference voltage to the non-inverting input of the operational amplifier.

A third aspect relates to a circuit for driving a light emitter in a photoplethysmography (PPG) system. The circuit includes a main control loop including an operational amplifier and a first transistor configured as a source follower; a preset circuit configured to set a voltage at an output of the operational amplifier to a preset voltage during a preset control phase, the preset circuit comprising a second transistor arranged in a diode configuration; and a switching circuit configured to: activate the preset circuit during the preset control phase by coupling the preset circuit to a non-inverting input of the operational amplifier, and activate the main control loop during a main control phase by decoupling the preset circuit and coupling a reference voltage to the non-inverting input of the operational amplifier.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
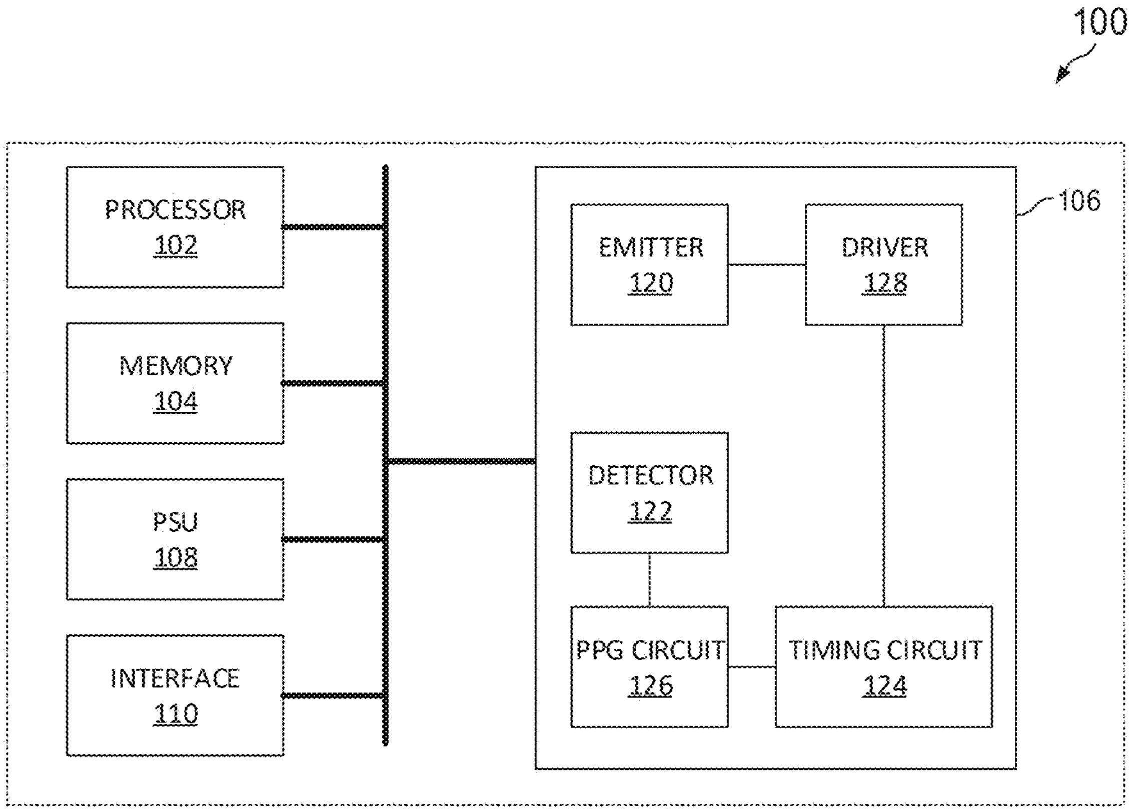
FIG. 1 is a block diagram of an embodiment system for Photoplethysmography (PPG) measurements.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of Photoplethysmography (PPG) measurements, it should also be appreciated that these inventive aspects may also apply to Light Emitting Diode (LED) drivers in general. In particular, aspects of this disclosure may similarly apply to other applications requiring precise control of short current pulses with very low duty cycles.

In embodiments, an approach to improve the performance of LED drivers used in photoplethysmography (PPG) applications is proposed to enhance the start-up phase of an LED driver circuit, for accurate and efficient PPG measurements.

Aspects of the disclosure propose a preconditioning control loop or a preset loop circuit to address the limitations of conventional current sink topologies used in LED drivers. In traditional designs, the main control loop is inactive when the output current is zero, leading to potential issues during the start-up phase. These issues can include delayed response times and uncontrolled initial current, potentially resulting in electromagnetic interference (EMI).

The preset loop circuit operates by setting the gate voltage of the output stage transistor closer to its threshold voltage before the main control loop activates. The preconditioning allows for a faster and more controlled rising time of the LED current when a pulse is initiated. The proposal achieves this without requiring complex trimming of operational amplifiers (op-amps), which would otherwise increase circuit complexity, area, and testing time.

By implementing the preset loop, the LED driver can achieve several advantages. It provides a faster settling time for the LED current, which can particularly benefit ambient light compensation in PPG systems to reduce the latency time of the driver circuit. The more controlled start-up can also reduce the potential for EMI, enhancing the overall system performance. The system and circuit also allow efficient operation at higher output data rates (ODR) without significantly increasing power consumption.

The disclosed proposal can be integrated into system-on-chip (SoC) solutions for healthcare monitoring devices that utilize PPG technology. It balances performance improvement and design simplicity, potentially leading to more accurate and power-efficient PPG measurements in various applications. These and additional details are further detailed below.

FIG. 1 illustrates a block diagram of an embodiment system 100 for Photoplethysmography (PPG) measurements. System 100 includes a processor 102, a memory 104, a sensor 106, a power supply unit (PSU) 108, and an interface 110, which may (or may not) be arranged as shown. Although one of each (i.e., the processor 102, the memory 104, the sensor 106, the power supply unit 108, and the interface 110) is shown in FIG. 1, the number of components is not limiting, and greater numbers are similarly contemplated in other embodiments.

System 100 may include additional components not depicted, such as long-term storage (e.g., non-volatile memory, etc.), power management circuitry, security and encryption modules (e.g., trusted platform modules (TPM), etc.), or the like. System 100 may be an electronic device, such as a smartwatch, fitness tracker, medical device (e.g., pulse oximeters), wristband, sports band, smart ring, earbuds, or any device capable of hosting the sensor 106.

In embodiments, each component can communicate with any other component internally within or external to the system 100. For example, each component can communicate using the I2C (Inter-Integrated Circuit), alternatively known as I2C or IIC, communication protocol, the I3C (Improved Inter Integrated Circuit) communication protocol, the serial peripheral interface (SPI) specification, or the like.

Processor 102 may be any component or collection of components adapted to perform computations or other processing-related tasks. In embodiments, processor 102 is an application processor, a baseband processor, or a microcontroller. In embodiments, processor 102 is configured to provide control signals for the timing circuit 124 to control the emission timing and detection of light by emitter 120 and detector 122.

Memory 104 may be any component or collection of components adapted to store programming, instructions, or calibration settings for execution or retrieval by processor 102. In an embodiment, memory 104 includes a non-transitory computer-readable medium.

Sensor 106 may be any component or collection of components adapted for PPG measurements. In embodiments, sensor 106 includes an emitter 120, a detector 122, a timing circuit 124, a PPG circuit 126, and a driver 128, which may (or may not) be arranged as shown. Sensor 106 may include additional components not shown, such as an integrated memory and a dedicated microcontroller.

Generally, sensor 106 can be set up in transmittance or reflectance modes. In the transmittance mode, the emitter 120 and the detector 122 are placed on opposite sides of the measuring site (e.g., fingertip or earlobe), and the detector 122 measures the light that has passed through the tissue. In the reflectance mode, the emitter 120 and detector 122 are placed on the same side of the measuring site, and the detector 122 measures the light reflected from tissues underneath.

Emitter 120 is configured to emit light at specific wavelengths toward the skin to penetrate the skin and tissue. As the emitted light travels through the skin, tissue, and blood vessels, some is absorbed while the rest is scattered or reflected. The amount of light absorbed varies with the pulsatile changes in blood volume due to cardiac cycles. The varying absorption caused by the changing blood volume (due to the heartbeat) alters the intensity of light either transmitted through or reflected from the tissue. This alteration forms the basis of the PPG signal. Emitter 120 can be, for example, light-emitting diodes (LEDs) or laser diodes.

Detector 122 is configured to capture the light that has either passed through (transmittance mode) or reflected (reflectance mode) from the body's tissue. Once the light reaches detector 122, it is converted into an electrical signal using the photoelectric effect, where photons hitting the detector 122 cause electrons to be released, resulting in a measurable current. Detector 122 can consist of, for example, photodiodes or photodetectors sensitive to the specific wavelengths of light emitted by the emitter 120.

The timing circuit 124 is configured to synchronize the emission of light by emitter 120 and the detection of the light by detector 122. In embodiments, timing circuit 124 may include a dedicated memory and controller to operate the operations of the sensor 106. However, in embodiments, the processor 102 and memory 104 of the host device may be used to control the operation of the sensor 106.

The PPG circuit 126 is configured to receive the differential electrical signal from the detector 122, generate compensation currents for the DC and ambient light components of the electrical signal, amplify the electrical signal, and isolate the PPG signal from unrelated signals or noise to improve the signal-to-noise ratio.

Driver 128 is configured to control the operation of emitter 120. In embodiments, driver 128 is implemented as a current sink, with a control loop realized using an operational amplifier and a source follower as the output stage. Driver 128 manages current pulses (typically short) and corresponding duty cycles (typically very low), controlling the intensity and timing of the light emitted by emitter 120. When inactive, driver 128 is typically turned off to conserve power. To improve start-up performance and reduce electromagnetic interference (EMI), driver 128 may incorporate a preconditioning control loop. In embodiments, the preset loop sets the gate of the voltage follower closer to the threshold voltage, allowing for faster activation of the main control loop when the emitter 120 needs to be activated for a PPG measurement.

PPG circuit 126 includes a digital-to-analog converter and an internal variable current generator (IDAC) that generates the current to compensate the ALC component.

Once detector 122 converts the light to an electrical signal, the PPG circuit 126 converts the analog electrical signal to a digital signal, which is processed and analyzed by, for example, the processor 102 of the host device. Concurrently, PPG circuit 126 is configured to provide compensation currents to remove unwanted Ambient Light Component (ALC) and the DC component of the PPG signal, further detailed below.

In embodiments, processor 102 receives data from sensor 106, interprets it, and converts it into usable biometric information, such as heart rate, heart rate variability, blood oxygen saturation (SpO2), and blood pressure trends. In embodiments, processor 102 is configured to alert a user of an anomaly related to the PPG measurement through interface 110. Processor 102 may apply signal processing algorithms to refine the data, compensating for factors like ambient light noise or object reflectivity variations to provide more reliable information.

Power supply unit 108 may be any component or collection of components that provide power to one or more components within the system 100. Power supply unit 108 may include various power management circuitry, charge storage components (i.e., battery), and the like.

Interface 110 may be any component or collection of components that allow processor 102 to communicate with other devices/components or a user.

Figure 2:
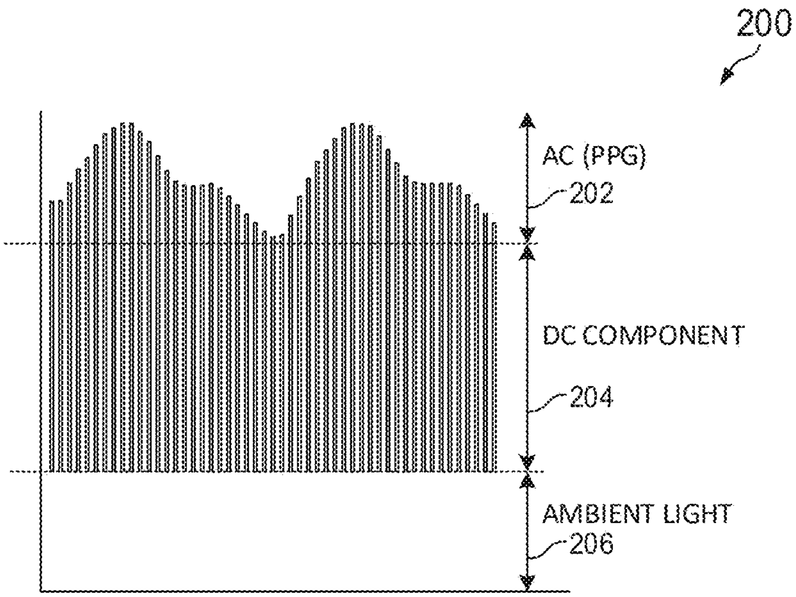
FIG. 2 is a plot of an example electrical signal from a detector.

FIG. 2 illustrates a plot of an example electrical signal 200 from the detector 122. After the photodetection process, the electrical signal 200 produced by detector 122 represents the various components of light intensity interacting with the blood flow in the tissue. As blood is pumped through the vessels by the heart, it causes pulsatile changes in the blood volume within the tissues. These changes modulate the intensity of the light received by the detector 122, resulting in an electrical signal with both time-varying (alternating current, AC) and non-varying (direct current, DC) components.

The AC component 202 of the electrical signal 200 is particularly interesting because it directly corresponds to the pulsatile blood volume changes-essentially, it can reflect the heart's rhythmic beating. AC component 202 is typically relatively small relative to the electrical signal 200, often representing less than 1% of the total detected signal; however, it carries the information needed to assess cardiovascular health and other physiological parameters.

On the other hand, the DC component 204 represents non-pulsatile elements of the electrical signal 200, including the baseline light absorption by the tissue, skin, bones, and non-pulsatile blood. DC component 204 is typically much larger than AC component 202 but doesn't carry information about the heart's pulsations. To isolate the AC component 202 of the electrical signal 200 and improve measurement accuracy, PPG circuit 126 can be configured to cancel out or minimize the impact of the DC component 204.

An ambient light component (ALC) 206 also contributes to the electrical signal 200. The ambient light component 206 includes extraneous light from the environment that is not generated by the emitter 120 but reaches the detector 122 nonetheless. Ambient light component 206 can introduce measurement errors because it can vary with changes in environmental lighting conditions and may add noise to the electrical signal 200. To isolate AC component 202 of the electrical signal 200 and improve measurement accuracy, PPG circuit 126 can be configured to cancel out or minimize the impact of the ambient light component 206.

Figure 3:
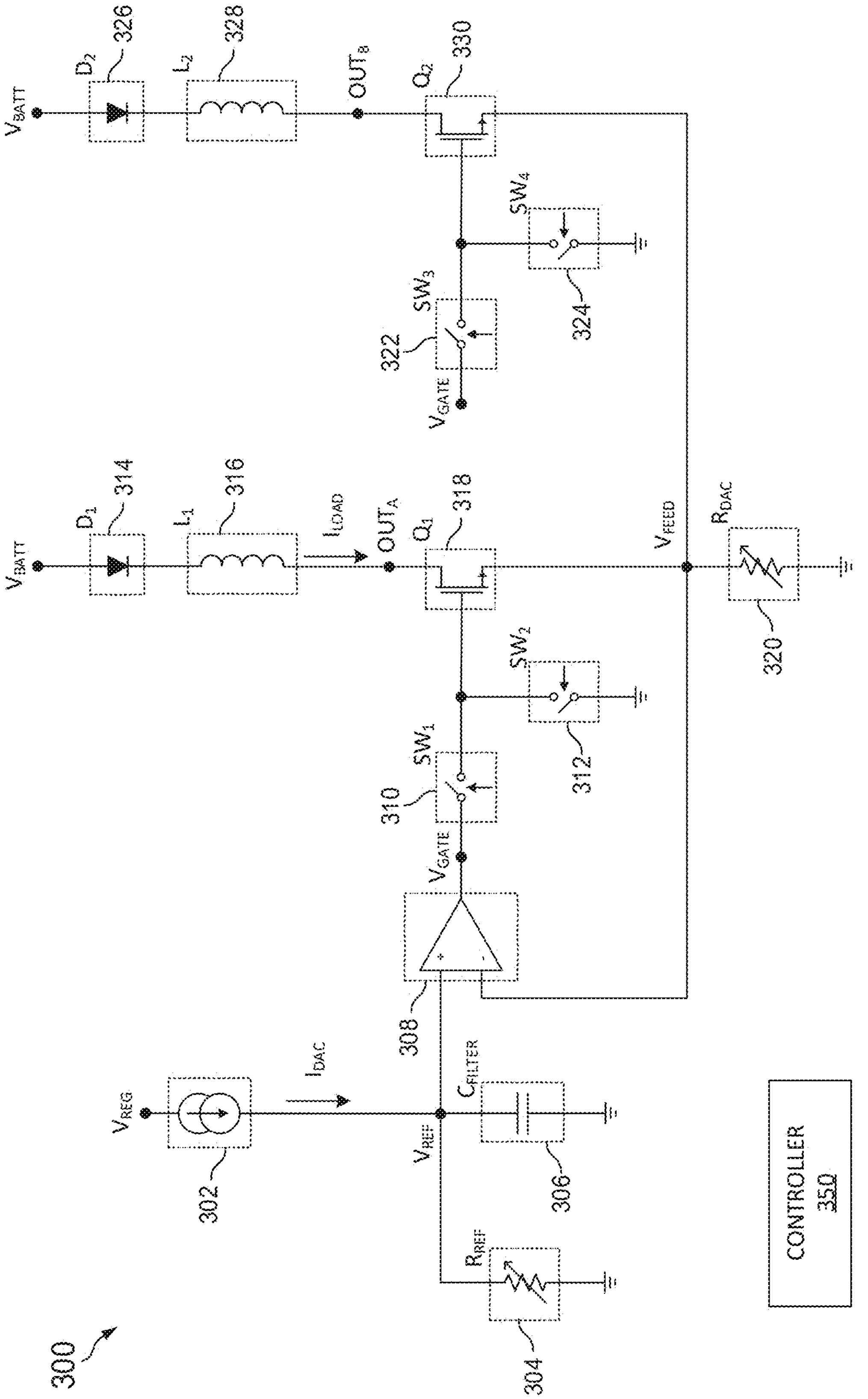
FIG. 3 is a simplified schematic of an example driver circuit.

FIG. 3 illustrates a simplified schematic of an example driver circuit 300, which may be implemented as driver 128 in system 100. Driver circuit 300 includes a current source 302, a reference resistor ($R_{REF}$) 304, a filter capacitor ($C_{FILTER}$) 306, an operational amplifier 308, a first switch ($SW_1$) 310, a second switch ($SW_2$) 312, a first diode ($D_1$) 314, a first inductor ($L_1$) 316 (i.e., the parasitic inductance of the path connection to the first diode ($D_1$) 314), a first transistor ($Q_1$) 318, a digital-to-analog resistor ($R_{DAC}$) 320, a third switch ($SW_3$) 322, a fourth switch ($SW_4$) 324, a second diode ($D_2$) 326, a second inductor ($L_2$) 328 (i.e., the parasitic inductance of the path connection to the second diode ($D_2$) 326), a second transistor ($Q_2$) 330, and an optional controller 350, which may (or may not) be arranged as shown. Driver circuit 300 may include additional components that are not shown, such as an integrated microcontroller, digital signal processor, memory, and the like.

In embodiments, the driver circuit 300 features a dual output configuration, with a first output ($OUT_A$) and a second output ($OUT_B$). It should be noted that the dual output configuration is a non-limiting example and fewer or greater number of outputs may be contemplated in other embodiments.

This configuration allows for flexible operation, as the driver circuit 300 can selectively drive either output independently. Such a configuration can be particularly useful when, for example, two different LEDs need to be driven. The versatility of the driver circuit 300 lies in its ability to choose between the first output ($OUT_A$) and the second output ($OUT_B$) based on specific application requirements.

The operation of the driver circuit 300 can be characterized as similar to a classical current sink. A voltage pulse is created at the reference voltage node ($V_{REF}$). The operational amplifier 308, through the first transistor ($Q_1$) 318, arranged as voltage follower or source follower, reports the voltage at the reference voltage node ($V_{REF}$) at the inverting input of the operational amplifier 308, which is coupled to the digital-to-analog resistor ($R_{DAC}$) 320 and the source terminal of the first transistor ($Q_1$) 318 through the feedback voltage ($V_{FEED}$) at the feedback node.

The configuration forms a feedback loop that maintains the voltage at the source terminal of the first transistor ($Q_1$) 318 equal to the voltage at the reference voltage node ($V_{REF}$), effectively converting the voltage pulse at the reference voltage node ($V_{REF}$) into a current through the digital-to-analog resistor ($R_{DAC}$) 320.

The driver circuit 300 effectively translates the voltage pulse at the reference voltage node ($V_{REF}$) into a current pulse. The current pulse is established external to the load, specifically at the drain terminal of the first transistor ($Q_1$) 318, which is coupled to the first diode ($D_1$) 314 and the first parasitic inductor ($L_1$) 316. The configuration allows for precise control of the current delivered to the output.

In embodiments, driver circuit 300 offers multiple to adjust the output current. For example, one approach involves modifying the value of the digital-to-analog resistor ($R_{DAC}$) 320. By altering this resistance, driver circuit 300 can directly influence the magnitude of the output current at the first output ($OUT_A$). Alternatively, the output current can be adjusted by varying the voltage at the reference voltage node ($V_{REF}$). The reference resistor ($R_{REF}$) 304 and the digital-to-analog resistor ($R_{DAC}$) 320 can be variable resistors tunable using, for example, controller 350.

For example, in embodiments, the reference voltage node ($V_{REF}$) voltage can be used for fine-tuning or trimming purposes. At the same time, the digitally variable resistor ($R_{DAC}$) 320 value can be used to set the baseline output current. However, it is important to note that other methods are also available for current adjustment. For instance, to increase the amplitude of the output signal, one can enhance the current level by reducing the resistance of the digitally variable resistor ($R_{DAC}$) 320. The flexibility in current control allows for precise output tailoring to meet specific application requirements.

The pulse generation in the driver circuit 300 is primarily controlled by the interaction of the current source 302, the reference resistor ($R_{REF}$) 304, and the filter capacitor ($C_{FILTER}$) 306. The current source 302 is coupled to a regulated voltage supply ($V_{REG}$), and the controller 350 provides a control signal to set the operation of the current source 302. In embodiments, the control signal may be generated by an external or internal controller (e.g., controller 350) that is synchronized with the operation of the system 100. The reference resistor ($R_{REF}$) 304 and the filter capacitor ($C_{FILTER}$) 306 are arranged as an RC filter which helps to determine the ramping behavior of the pulse. Each of the reference resistor ($R_{REF}$) 304 and the filter capacitor ($C_{FILTER}$) 306 have a first terminal coupled to the output of the current source 302 and the non-inverting input of the operational amplifier 308 at the reference voltage node ($V_{REF}$).

These elements work in concert to shape the characteristics of the output pulse at the reference voltage node ($V_{REF}$). The current source 302, which can be adjusted using digital control signals, provides the initial input for pulse generation. The RC filter formed by reference resistor ($R_{REF}$) 304 and the filter capacitor ($C_{FILTER}$) 306 modifies this input, defining the specific ramping characteristics of the pulse. In this arrangement, the filter capacitor ($C_{FILTER}$) 306 smooths the pulse's slope. The smoothing effect helps to reduce abrupt changes in the pulse shape, potentially minimizing electromagnetic interference and improving the overall quality of the output signal. The combination of the components allows for precise control over the pulse shape, enabling the circuit to generate well-defined current pulses suitable for applications such as LED driving in PPG measurements.

The output of the operational amplifier 308 is coupled to the gate terminal of the first transistor ($Q_1$) 318 through the first switch ($SW_1$) 310. The second switch ($SW_2$) 312 is coupled between ground and the gate terminal of the first transistor ($Q_1$) 318. In embodiments, the first transistor ($Q_1$) 318 is implemented as an n-channel metal-oxide-semiconductor field-effect transistor (MOSFET). The drain terminal of the first transistor ($Q_1$) 318 is coupled to an external voltage ($V_{BATT}$) through the first diode ($D_1$) 314 and the first inductor ($L_1$) 316, which are arranged in series.

The driver circuit 300 can support various digital interfaces, allowing for easy programming and adjustment of operational parameters. The driver circuit 300 offers significant flexibility in its operation, allowing for dynamic configuration based on specific application requirements and operational modes. The current source 302 can be set by an external source, accommodating various input conditions. The output current is configurable, enabling fine-tuning for optimal performance in different scenarios.

Components such as the current source 302, the reference resistor ($R_{REF}$) 304, and the digital-to-analog resistor ($R_{DAC}$) 320 can be controlled by the controller 350, which can be an integrated digital signal processor (DSP). The controller 350 may be internal to driver circuit 300 or integrated within the host device or system 100. This arrangement allows for the dynamic adjustment of various parameters, enabling real-time control over the driver circuit's output. In embodiments, driver circuit 300 incorporates programmable features that enhance its versatility. For instance, if the current level needs to be altered during operation, this can be accomplished through programming within the chip. The functionality may require a minimal amount of memory and DSP capabilities.

Pulse generation at the reference voltage node ($V_{REF}$) can be synchronized with the overall system operation. For example, controller 350 can manage the sampling operation of the first cycle. This means that the current pulse during PPG sampling can be controlled by the controller 350, which also manages the synchronization between sampling events. The integrated approach can ensure precise timing and coordination of the functions of driver circuit 300 with the broader system requirements.

In embodiments, driver circuit 300 can maintain zero output during off periods. This can be achieved using the first switch ($SW_1$) 310 and the second switch ($SW_2$) 312. These switches are employed to set the gate of the first transistor ($Q_1$) 318 to ground during the OFF mode. The operation of these switches can be synchronized with the overall system, ensuring that during the cycle's OFF time, the driver circuit's output at, for example, the first output ($OUT_A$) is maintained at zero by grounding the gate terminal of the first transistor ($Q_1$) 318.

It is important to note that the dual output functionality is an optional feature of the driver circuit 300. The components associated with the second output ($OUT_B$), namely the third switch ($SW_3$) 322, the fourth switch ($SW_4$) 324, the second diode ($D_2$) 326, the second inductor ($L_2$) 328, and the second transistor ($Q_2$) 330, are not essential for the basic operation of the driver circuit 300. In implementations requiring only a single output, these components may be omitted, resulting in a simpler circuit focused solely on driving the first output ($OUT_A$). Although the description is based on the operation of the first output ($OUT_A$), it should be understood that a similar operation can be set for the second output ($OUT_B$).

Figure 4:
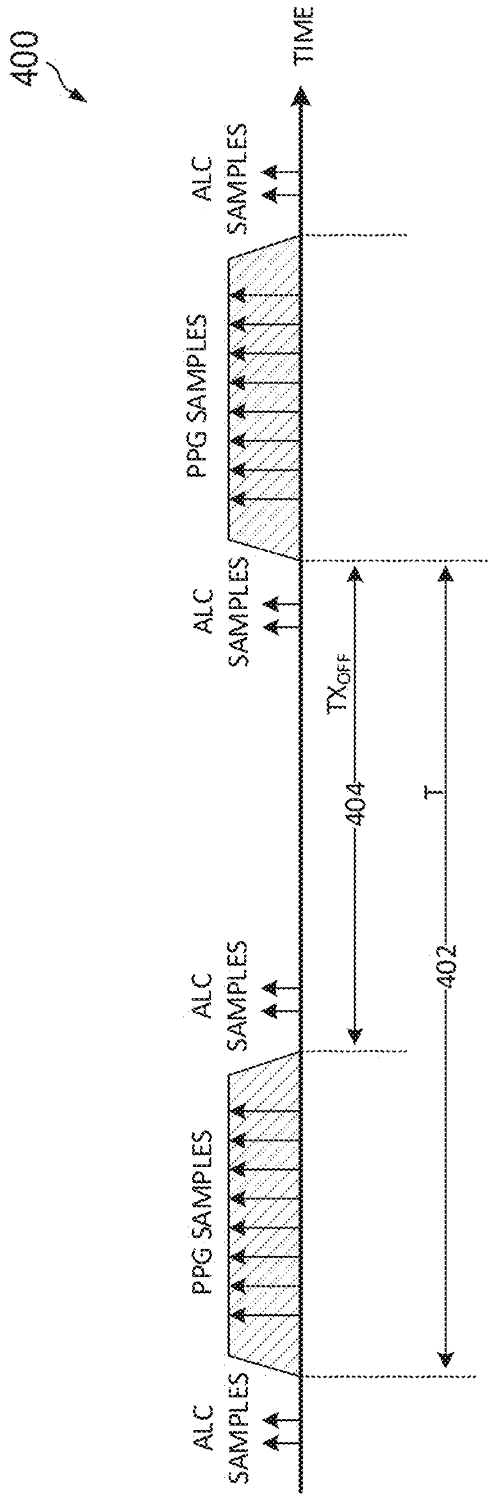
FIG. 4 is an embodiment timing diagram of a PPG measurement system.

FIG. 4 illustrates an embodiment timing diagram 400 of a PPG measurement system. As shown, timing diagram 400 illustrates the operation and the sampling process of the driver circuit 300, which may correspond to driver 128 of system 100. The timing diagram 400 depicts two measurement cycles, representing the periodic nature of the PPG sampling process.

The total cycle time (T) 402 represents the time from the start of one PPG sampling period to the start of the next. The cyclical nature allows for continuous monitoring while maintaining the low-duty cycle operation. The driver circuit 300 produces periodic current pulses with a typically low-duty cycle of 1% to 10%. During the off-time (i.e., OFF period ($TX_{OFF}$) 404) between pulses, the transmitter is switched off through the driver circuit 300 to conserve power and enhance overall efficiency. This power-saving strategy can be particularly beneficial in critical energy consumption applications like battery-operated devices.

The operation of the driver circuit 300 involves switching it ON and OFF to generate each pulse. The cyclical activation helps create the desired pulse pattern. The sampling process associated with these pulses is divided into two distinct regions: the PPG (Photoplethysmography) sampling, which occurs within the pulse duration and PPG measurements are being taken, and the ALC (Ambient Light Compensation) sampling, which occurs immediately before and after the main PPG sampling. The active period can be characterized by short, well-defined current pulses, allowing for precise control of the light emission for PPG readings. The proximity of these ALC samples to the PPG samples allows for effective cancellation of ambient light interference and more accurate compensation by capturing the ambient light conditions as close as possible to the actual PPG measurement.

For optimal performance, it is advantageous to maintain zero current flow through the driver circuit 300 outside the PPG sampling period. The condition ensures that the pulse is precisely zero when not actively sampling PPG data. Achieving this zero-current state outside the PPG sampling duration allows for accurate measurements and efficient power management.

In addition to maintaining zero current outside the sampling period, another consideration is the settling time of the driver circuit 300. A fast settling time is advantageous, allowing for more efficient power utilization. Minimizing the settling time makes it possible to reduce the interval between the PPG sampling and the ALC sampling periods. Reducing transition time improves overall system performance and enables more frequent or precise measurements without significantly increasing power consumption.

Combining these features—zero current outside sampling periods and fast settling time—allows for an optimized balance between accurate PPG measurements, effective ambient light compensation, and efficient power management. The design approach is particularly valuable in applications where both measurement accuracy and power efficiency are critical, such as wearable health monitoring devices or other battery-operated PPG systems.

Driver circuit 300 offers extensive customization options to suit various operational requirements. For instance, users can specify the sampling frequency for PPG measurements, such as setting it to 100 Hertz. The user-defined parameter can be programmed into the system, and subsequently, the synchronization of the entire system adapts parametrically to accommodate this selection.

Another customizable aspect can be the number of PPG samples taken during the ON time and the number of ALC samples during the OFF time. For example, users might opt for eight PPG samples and ALC samples, with these numbers being programmable parameters. If a user decides to increase the signal-to-noise ratio by averaging eight samples, the system can automatically adjust the length of the sampling period or pulse duration to accommodate the requirement. During this phase, the receiver circuitry remains fully active, typically switched ON shortly before the first sampling to optimize power consumption.

The operation of the driver circuit 300 can commence after this initial setup, with all synchronization being parametrically defined internally based on the system's configuration parameters. The parameters can include the number of averages, cycle repetition time, current levels, and other factors. System 100 also offers the flexibility to repeat operations using different light sources and receivers to obtain ratio measurements between photodiodes or LEDs.

While numerous parameters can be adjusted during operation, the user typically chooses all configuration parameters and directly inputs into the system 100. The resulting data is usually supplied externally to the user and often processed by a microcontroller. The data can undergo further post-processing to extract additional information, such as through Fast Fourier Transform (FFT) analysis or other techniques.

The highly configurable approach allows the system to be tailored to specific application needs while maintaining efficient operation and synchronization across all components. It allows users to fine-tune the PPG measurement process, balancing signal quality, power consumption, and measurement complexity according to their specific requirements.

Driver circuit 300 operates on a periodic on-off cycle, which introduces certain limitations. A primary challenge arises during the startup of each pulse when the gate voltage ($V_{GATE}$) is zero and the control loop is inactive. At this point, with no current flowing through the digital-to-analog resistor ($R_{DAC}$) 320 and the source of the first transistor ($Q_1$) 318, the first transistor ($Q_1$) 318 is completely off, and the feedback voltage ($V_{FEED}$) in the loop to the operational amplifier 308 is essentially zero, and consequently the current in the first transistor ($Q_1$) 318. Under this situation the control loop is practically non-existent.

This situation creates a delay in the response. When the reference voltage ($V_{REF}$) begins to ramp up, the feedback voltage ($V_{FEED}$) does not immediately follow. Instead, it remains static for a few microseconds, resulting in a delay. The delay occurs because the low initial reference voltage ($V_{REF}$) produces very little current through the digital-to-analog resistor ($R_{DAC}$) 320. This keeps the voltage follower's current minimal and the loop effectively off. When sufficient feedback develops at the gate voltage ($V_{GATE}$), the current begins to flow, allowing the feedback voltage ($V_{FEED}$) to start tracking the reference voltage ($V_{REF}$).

The behavior of the driver circuit 300 can be understood through the transfer function of a source follower. This transfer function can be represented as:

$$\frac{V_{OUT}}{V_{IN}} = \frac{g_m \times R_0}{1 + g_m \times R_0} \cdot \frac{1 + s\frac{C_{gs}}{gm}}{1 + s\frac{R_0(C_{gs} + C_0')}{1 + g_m R_0}}.$$

In this equation, $$\frac{g_m \times R_0}{1 + g_m \times R_0}$$

represents the gain (i.e., $G_o$-DC GAIN). The term $$\left(1 + s\frac{C_{gs}}{gm}\right)$$

represents the $\omega_z$-zero, and $$\frac{1 + s\frac{C_{gs}}{gm}}{1 + s\frac{R_0(C_{gs} + C_0')}{1 + g_m R_0}}$$

represents the $\omega_p$—Main Pole. $R_0$ and $C_0$' are equivalent resistance and capacitance at the source of the source follower and are obtained from the DAC input admittance. The output voltage $V_{OUT}$ is the voltage at the source terminal of the source follower, the input voltage $V_{IN}$ is the gate voltage of the source follower, $C_{gs}$ is coupled between the gate and the source of the source follower, and $g_m$ is the transconductance of the transistor.

When the output current ($I_{OUT}$) equals zero, the transconductance $g_m$ is zero, resulting in the gain of the source follower becoming zero. Consequently, the control loop doesn't follow the reference voltage ($V_{REF}$) during startup, contributing to the observed delay in the circuit's response.

A second challenge in the driver circuit 300 arises from the potential offset in the operational amplifier 308. The offset is particularly problematic because it forces the inverting input of the operational amplifier 308 to be higher than its non-inverting input, resulting in the feedback voltage ($V_{FEED}$) exceeding the reference voltage ($V_{REF}$).

The situation can create a problem in the operation of driver circuit 300 in system 100. For example, when the feedback voltage is ten millivolts higher than the reference voltage ($V_{REF}$) due to the offset, it can lead to a residual load current before the intended ramping up of the feedback voltage ($V_{FEED}$). The impact of this offset can be substantial, as even a small ten-millivolt difference can generate several milliamps of current at the startup of the circuit when the first switch ($SW_1$) 310 or the third switch ($SW_3$) 322 is switched on because of the possible uncontrolled high value of the gate voltage ($V_{GATE}$). For example, if the gate voltage is forced to zero during the OFF operation, the driver can slow down with higher latency. As another example, if the gate voltage is not forced to zero and maintained at the last operating point (e.g., to speed up the switching on of the circuit), due to the offset, the gate voltage value can exceed the final value, producing a higher current peak, increasing EMI.

The consequence of the unwanted current can be an incorrect ALC sampling. It introduces an undesired component that causes errors in the ALC measurements, potentially compromising the accuracy of the entire system. A conventional approach to addressing this issue involves trimming the operational amplifier 308. However, this solution necessitates additional circuitry and increases test time, adding complexity and cost to the manufacturing process. Alternatively, the ALC sampling has to be moved up, increasing the operation time and power consumption.

Embodiments of this disclosure provide a solution that eliminates the need for trimming circuitry and the requisite test time. Advantageously, the proposed solution reduces circuit footprint and reduces circuit and system test time.

Figure 5:
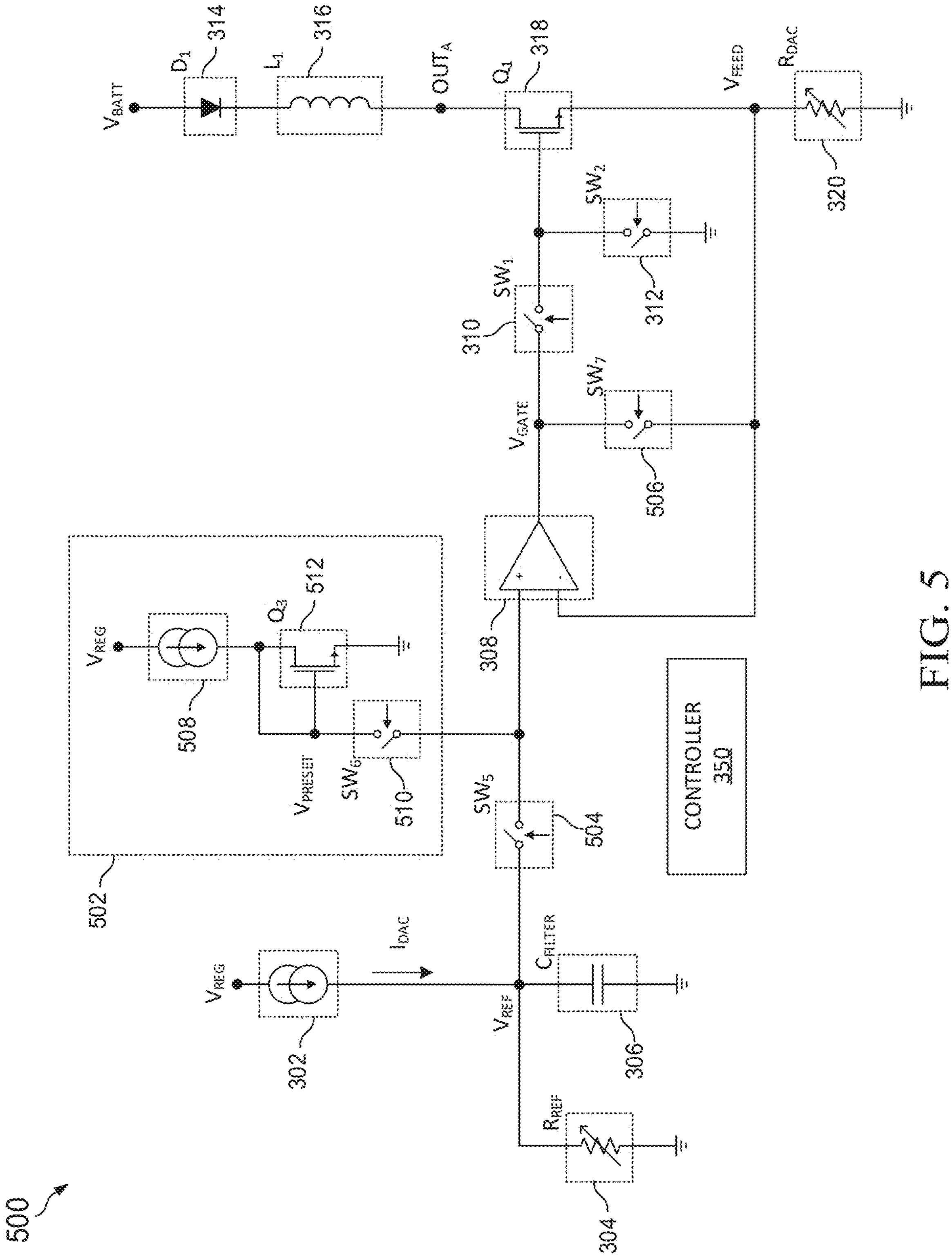
FIG. 5 is a block diagram of an embodiment driver circuit.
Figure 6:
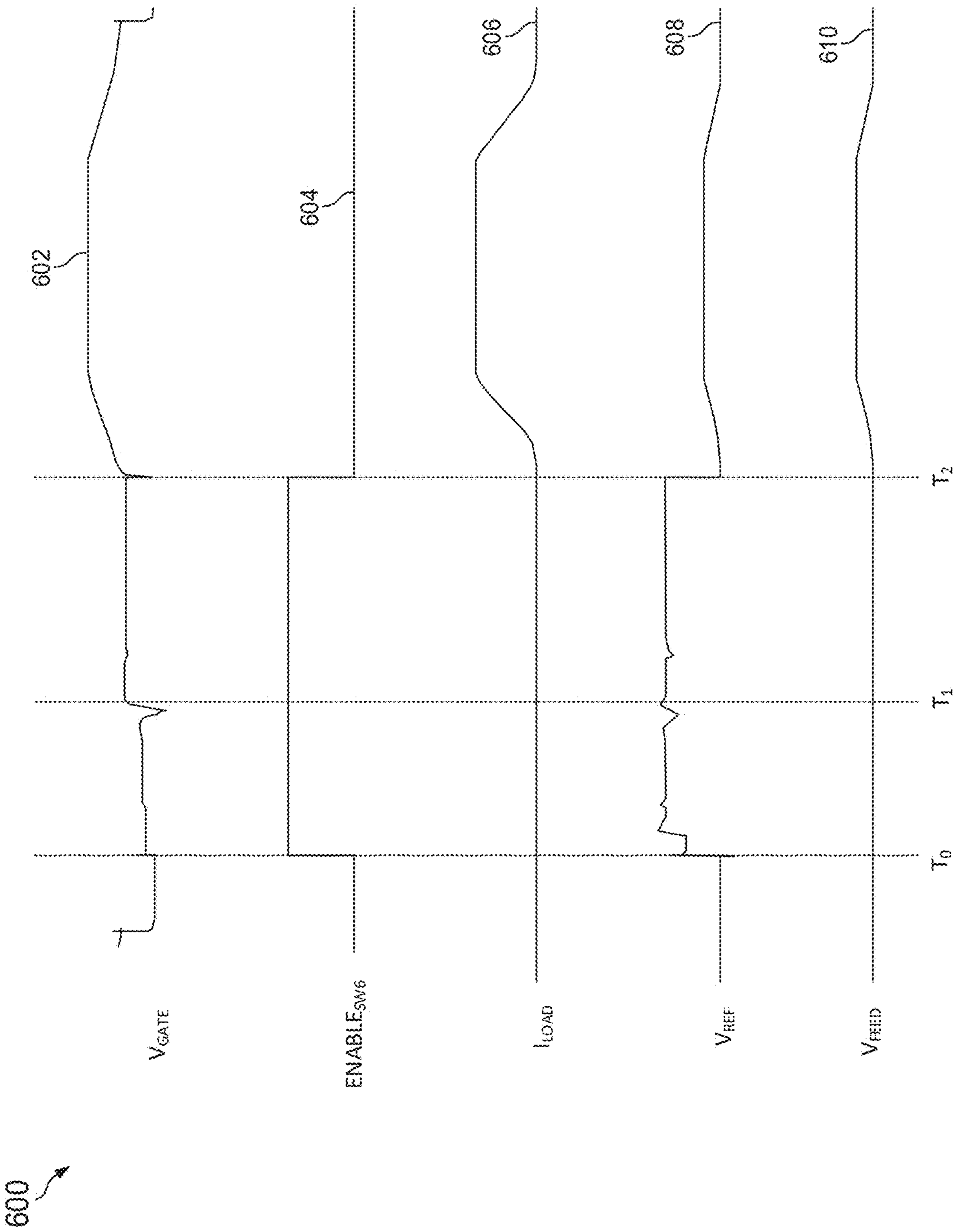
FIG. 6 is a timing diagram of pulses and sampling times for a driver circuit.

FIG. 5 illustrates a block diagram of an embodiment driver circuit 500, which may be implemented as driver 128 in system 100. FIG. 6 illustrates a timing diagram 600 of pulses and sampling times for the driver circuit 500.

For brevity, components previously discussed with respect to the driver circuit 300 in FIG. 3, which are common to the driver circuit 500 in FIG. 5, are not repeated here; these shared components retain the same structure and functions unless otherwise specified.

Driver circuit 500, in addition to the components previously discussed in the driver circuit 300, includes a preset circuit 502, a fifth switch (SW) 504, and a seventh switch ($SW_7$) 504, which may or may not be arranged as shown. preset circuit 502 includes a second current source 508, a sixth switch (SW) 510, and a third transistor ($Q_3$) 512, which may (or may not) be arranged as shown. Driver circuit 500 may include additional components that are not shown.

In embodiments, the operation of the driver circuit 500 includes a preset control mode, also referred to as a preset control phase. The preset control mode incorporates the preset circuit 502, implemented using a preset reference voltage ($V_{PRESET}$) derived from the regulated voltage ($V_{REG}$), the second current source 508, and third transistor ($Q_3$) 512 arranged in a simple diode configuration (i.e., diode-connected transistor) with the drain of the third transistor ($Q_3$) 512 coupled to its gate. The preset reference voltage ($V_{PRESET}$) correlates with the output stage of the driver circuit 500.

In embodiments, the preset circuit 502 is realized using a scaled copy of the output stage operating in subthreshold mode. The configuration is chosen to set the gate voltage ($V_{GATE}$) to a value that is not exactly zero but just below to the threshold voltage ($V_{TH}$) of the first transistor ($Q_1$) 318 before the main operation begins. By operating in the subthreshold region, the preset circuit 502 can fine-tune the initial conditions of the preset circuit 502, addressing the startup delay issues previously discussed.

The preset control mode aims to improve the response of the driver circuit 500 during the startup phase, mitigating the limitations observed in the driver circuit 300. It provides a mechanism to pre-condition the driver circuit 500, particularly the gate voltage ($V_{GATE}$) of the first transistor ($Q_1$) 318 before the full operation commences.

Driver circuit 500 is configured with a faster settling time, which can be achieved through the preset circuit 502, which sets the gate voltage ($V_{GATE}$) of the source follower closer to the threshold voltage ($V_{TH}$). The preconditioning allows for faster activation of the main control loop at the start of each PPG sampling period, resulting in a controlled and rapid rise in the pulse of LED current.

The optimized driver circuit 500 offers several advantages over driver circuit 300. It eliminates the need to trim the operational amplifier 308, which would otherwise increase circuit complexity, area, and testing time. Additionally, it avoids the drawbacks of simply enlarging the operation time, which would increase power consumption and reduce the maximum achievable output data rate (ODR).

Driver circuit 500 provides an efficient solution for PPG measurements, balancing the need for accurate sampling, ambient light compensation, low power consumption, and fast response times. The proposed driver circuit 500 and preset control mode are particularly well-suited for applications in wearable health monitoring devices where power efficiency and measurement accuracy are crucial.

The operation of the driver circuit 500 can be divided into distinct phases, as illustrated in FIG. 6. The preset mode occurs between time $T_o$ and time $T_2$. At time $T_o$, the behavior of the switches is the following: the first switch ($SW_1$) 310 is open and the second switch ($SW_2$) 312 is closed, grounding the gate terminal of the first transistor ($Q_1$) 318, as the driver is off. At time $T_o$, the enable signal ($ENABLE_{SW6}$) 604 transitions to a logic high, activating the sixth switch ($SW_6$) 510 and the seventh switch ($SW_7$) 506.

Activating the preset circuit 502 at time $T_o$ couples it to the non-inverting input of the operational amplifier 308, while decoupling the main loop components (i.e., current source 302, reference resistor ($R_{REF}$) 304, and filter capacitor ($C_{FILTER}$) 306). During the preset phase, the seventh switch ($SW_7$) 506 configures the operational amplifier 308 as a voltage follower, effectively transferring the preset voltage ($V_{PRESET}$) to the gate voltage ($V_{GATE}$) 602. The preset voltage is carefully set through the second current source 508 and the third transistor ($Q_3$) 512 to maintain the output pulse ($I_{LOAD}$) 606 near 0 μA.

At time $T_2$, after allowing time for the preset circuit 502 to stabilize and set the gate voltage ($V_{GATE}$) 602 to a subthreshold value, the enable signal ($ENABLE_{SW6}$) 604 transitions back to logic low. This action deactivates activating the sixth switch ($SW_6$) 510 and the seventh switch ($SW_7$) 506, setting the output of the operational amplifier 308 to the subthreshold value (e.g., around 450 mV).

The main control loop activates at time $T_2$, when the rising ramp starts. The preset circuit 502 is decoupled from the operational amplifier 308, and the main loop is reconnected. The first switch ($SW_1$) 310 is activated and the second switch ($SW_2$) 312 is deactivated.

The preset mechanism offers several advantages. It allows the gate voltage to start from a controlled point at time $T_2$, very close to the operational voltage of the first transistor ($Q_1$) 318. Further, the gate voltage is properly set independently from any operational amplifier 308 offset condition. This results in time savings as the feedback voltage ($V_{FEED}$) is 610, and thus, the output pulse ($I_{LOAD}$) 606 closely follows the reference voltage ($V_{REF}$) 608. Additionally, it eliminates the need for operational amplifier trimming to compensate for voltage offset because all the system errors that affect the current precision can be compensated by trimming the reference resistor ($R_{REF}$) 304.

Further, the driver circuit 500 becomes more robust by selecting a preset voltage ($V_{PRESET}$) that can accommodate potential variations due to the operational amplifier's offset voltage. For example, if the target operating voltage at the first transistor ($Q_1$) 318 is 600 mV, setting the preset voltage ($V_{PRESET}$) to 500 mV can absorb offset errors in the 10 to 50 mV range without affecting transistor operation.

The timing of time $T_2$ can be determined in different ways. It may be preset to a fixed duration or dynamically determined using a circuit that compares the gate voltage ($V_{GATE}$) 602 to a threshold value. In the latter case, the preset loop is decoupled and the main loop is engaged when the gate voltage ($V_{GATE}$) 602 reaches the specified threshold.

A first aspect relates to a system for photoplethysmography (PPG) measurements. The system includes a light emitter; a light detector configured to detect light from the light emitter; and a driver circuit coupled to the light emitter, the driver circuit comprises: a main control loop including an operational amplifier and a first transistor configured as a source follower, a preset circuit coupled to the operational amplifier and configured to set a voltage at an output of the operational amplifier to a preset voltage during a preset control phase, and a switching circuit configured to activate the preset circuit during the preset control phase and to activate the main control loop during a main control phase.

In a first implementation form of the system, according to the first aspect as such, the preset circuit comprises a current source; a second transistor arranged in a diode configuration; and a third switch coupled between a gate terminal of the second transistor and a non-inverting input of the operational amplifier.

In a second implementation form of the system, according to the first aspect as such or any preceding implementation form of the first aspect, the preset circuit is configured to set the voltage at the output of the operational amplifier close to a threshold voltage of the first transistor.

In a third implementation form of the system, according to the first aspect as such or any preceding implementation form of the first aspect, the switching circuit comprises a first switch coupled between the output of the operational amplifier and a gate of the first transistor; a second switch coupled between the gate of the first transistor and ground; and a third switch configured to couple the preset circuit to a non-inverting input of the operational amplifier during the preset control phase.

In a fourth implementation form of the system, according to the first aspect as such or any preceding implementation form of the first aspect, the switching circuit further comprises a fourth switch configured to couple the output of the operational amplifier to an inverting input of the operational amplifier during the preset control phase.

In a fifth implementation form of the system, according to the first aspect as such or any preceding implementation form of the first aspect, the driver circuit further comprises a digital-to-analog resistor coupled between a source of the first transistor and ground.

In a sixth implementation form of the system, according to the first aspect as such or any preceding implementation form of the first aspect, the main control loop further comprises a current source; a reference resistor coupled to the current source; and a filter capacitor coupled in parallel with the reference resistor.

In a seventh implementation form of the system, according to the first aspect as such or any preceding implementation form of the first aspect, the driver circuit is configured to generate current pulses for driving the light emitter with a duty cycle between 1% and 10%.

In an eighth implementation form of the system, according to the first aspect as such or any preceding implementation form of the first aspect, the system is further configured to perform ambient light compensation (ALC) sampling immediately before and after a PPG sampling period.

A second aspect relates to a driver circuit for a light emitter in a photoplethysmography (PPG) system. The driver circuit includes an operational amplifier; a first transistor configured as a source follower, with a gate of the first transistor coupled to an output of the operational amplifier; a preset circuit configured to set a voltage at the output of the operational amplifier to a preset voltage during a preset control phase; and a switching circuit configured to: couple the preset circuit to a non-inverting input of the operational amplifier during the preset control phase, and activate a main control loop during a main control phase by coupling a reference voltage to the non-inverting input of the operational amplifier.

In a first implementation form of the driver circuit, according to the second aspect as such, the preset circuit comprises a current source; a second transistor arranged in a diode configuration; and a switch coupled between a gate terminal of the second transistor and the non-inverting input of the operational amplifier.

In a second implementation form of the driver circuit, according to the second aspect as such or any preceding implementation form of the second aspect, the switching circuit comprises a first switch coupled between the output of the operational amplifier and the gate of the first transistor; a second switch coupled between the gate of the first transistor and ground; and a third switch configured to couple the preset circuit to the non-inverting input of the operational amplifier during the preset control phase.

In a third implementation form of the driver circuit, according to the second aspect as such or any preceding implementation form of the second aspect, the switching circuit further comprises a fourth switch configured to couple the output of the operational amplifier to an inverting input of the operational amplifier during the preset control phase.

In a fourth implementation form of the driver circuit, according to the second aspect as such or any preceding implementation form of the second aspect, the driver circuit further comprising a digital-to-analog resistor coupled between a source of the first transistor and ground.

In a fifth implementation form of the driver circuit, according to the second aspect as such or any preceding implementation form of the second aspect, the main control loop comprises a current source; a reference resistor coupled to the current source; and a filter capacitor coupled in parallel with the reference resistor.

A third aspect relates to a circuit for driving a light emitter in a photoplethysmography (PPG) system. The circuit includes a main control loop including an operational amplifier and a first transistor configured as a source follower; a preset circuit configured to set a voltage at an output of the operational amplifier to a preset voltage during a preset control phase, the preset circuit comprising a second transistor arranged in a diode configuration; and a switching circuit configured to: activate the preset circuit during the preset control phase by coupling the preset circuit to a non-inverting input of the operational amplifier, and activate the main control loop during a main control phase by decoupling the preset circuit and coupling a reference voltage to the non-inverting input of the operational amplifier.

In a first implementation form of the circuit, according to the third aspect as such, the preset circuit further comprises a current source; and a switch coupled between a gate terminal of the second transistor and the non-inverting input of the operational amplifier.

In a second implementation form of the circuit, according to the third aspect as such or any preceding implementation form of the third aspect, the switching circuit comprises a first switch coupled between the output of the operational amplifier and a gate of the first transistor; a second switch coupled between the gate of the first transistor and ground; a third switch configured to couple the preset circuit to the non-inverting input of the operational amplifier during the preset control phase; and a fourth switch configured to couple the output of the operational amplifier to an inverting input of the operational amplifier during the preset control phase.

In a third implementation form of the circuit, according to the third aspect as such or any preceding implementation form of the third aspect, the circuit further comprising a digital-to-analog resistor coupled between a source of the first transistor and ground.

In a fourth implementation form of the circuit, according to the third aspect as such or any preceding implementation form of the third aspect, the main control loop further comprises a current source; a reference resistor coupled to the current source; and a filter capacitor coupled in parallel with the reference resistor.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system for photoplethysmography (PPG) measurements, comprising:
- a light emitter;
- a light detector configured to detect light from the light emitter; and
- a driver circuit coupled to the light emitter, the driver circuit comprising:
  - a main control loop including an operational amplifier and a first transistor configured as a source follower,
  - a preset circuit coupled to the operational amplifier and configured to set a voltage at an output of the operational amplifier to a preset voltage during a preset control phase, and
  - a switching circuit configured to activate the preset circuit during the preset control phase and to activate the main control loop during a main control phase.

2. The system of claim 1, wherein the preset circuit comprises:
- a current source;
- a second transistor arranged in a diode configuration; and
- a third switch coupled between a gate terminal of the second transistor and a non-inverting input of the operational amplifier.

3. The system of claim 1, wherein the preset circuit is configured to set the voltage at the output of the operational amplifier close to a threshold voltage of the first transistor.

4. The system of claim 1, wherein the switching circuit comprises:
- a first switch coupled between the output of the operational amplifier and a gate of the first transistor;
- a second switch coupled between the gate of the first transistor and ground; and
- a third switch configured to couple the preset circuit to a non-inverting input of the operational amplifier during the preset control phase.

5. The system of claim 4, wherein the switching circuit further comprises a fourth switch configured to couple the output of the operational amplifier to an inverting input of the operational amplifier during the preset control phase.

6. The system of claim 1, wherein the driver circuit further comprises a digital-to-analog resistor coupled between a source of the first transistor and ground.

7. The system of claim 1, wherein the main control loop further comprises:
- a current source;
- a reference resistor coupled to the current source; and
- a filter capacitor coupled in parallel with the reference resistor.

8. The system of claim 1, wherein the driver circuit is configured to generate current pulses for driving the light emitter with a duty cycle between 1% and 10%.

9. The system of claim 1, wherein the system is further configured to perform ambient light compensation (ALC) sampling immediately before and after a PPG sampling period.

10. A driver circuit for a light emitter in a photoplethysmography (PPG) system, the driver circuit comprising:
- an operational amplifier;
- a first transistor configured as a source follower, a gate of the first transistor coupled to an output of the operational amplifier;
- a preset circuit configured to set a voltage at the output of the operational amplifier to a preset voltage during a preset control phase; and a switching circuit configured to:

couple the preset circuit to a non-inverting input of the operational amplifier during the preset control phase, and activate a main control loop during a main control phase by coupling a reference voltage to the non-inverting input of the operational amplifier.

11. The driver circuit of claim 10, wherein the preset circuit comprises:

a current source;

a second transistor arranged in a diode configuration; and a switch coupled between a gate terminal of the second transistor and the non-inverting input of the operational amplifier.

12. The driver circuit of claim 10, wherein the switching circuit comprises:

a first switch coupled between the output of the operational amplifier and the gate of the first transistor;

a second switch coupled between the gate of the first transistor and ground; and a third switch configured to couple the preset circuit to the non-inverting input of the operational amplifier during the preset control phase.

13. The driver circuit of claim 12, wherein the switching circuit further comprises a fourth switch configured to couple the output of the operational amplifier to an inverting input of the operational amplifier during the preset control phase.

14. The driver circuit of claim 10, further comprising a digital-to-analog resistor coupled between a source of the first transistor and ground.

15. The driver circuit of claim 10, wherein the main control loop comprises:

a current source;

a reference resistor coupled to the current source; and a filter capacitor coupled in parallel with the reference resistor.

16. A circuit for driving a light emitter in a photoplethysmography (PPG) system, the circuit comprising:

a main control loop including an operational amplifier and a first transistor configured as a source follower;

a preset circuit configured to set a voltage at an output of the operational amplifier to a preset voltage during a preset control phase, the preset circuit comprising a second transistor arranged in a diode configuration; and a switching circuit configured to:

activate the preset circuit during the preset control phase by coupling the preset circuit to a non-inverting input of the operational amplifier, and activate the main control loop during a main control phase by decoupling the preset circuit and coupling a reference voltage to the non-inverting input of the operational amplifier.

17. The circuit of claim 16, wherein the preset circuit further comprises:

a current source; and a switch coupled between a gate terminal of the second transistor and the non-inverting input of the operational amplifier.

18. The circuit of claim 16, wherein the switching circuit comprises:

a first switch coupled between the output of the operational amplifier and a gate of the first transistor;

a second switch coupled between the gate of the first transistor and ground;

a third switch configured to couple the preset circuit to the non-inverting input of the operational amplifier during the preset control phase; and a fourth switch configured to couple the output of the operational amplifier to an inverting input of the operational amplifier during the preset control phase.

19. The circuit of claim 16, further comprising a digital-to-analog resistor coupled between a source of the first transistor and ground.

20. The circuit of claim 16, wherein the main control loop further comprises:

a current source;

a reference resistor coupled to the current source; and a filter capacitor coupled in parallel with the reference resistor.

* * * * *